United States Patent
Tong

(10) Patent No.: US 8,934,568 B2
(45) Date of Patent: Jan. 13, 2015

(54) DATA ENCODING METHOD AND APPARATUS

(75) Inventor: Fei Tong, Royston (GB)

(73) Assignee: Cambridge Silicon Radio Limited, Cambridge (GB)

( * ) Notice: Subject to any disclaimer, the term of this patent is extended or adjusted under 35 U.S.C. 154(b) by 20 days.

(21) Appl. No.: 13/617,091

(22) Filed: Sep. 14, 2012

(65) Prior Publication Data

US 2014/0079150 A1    Mar. 20, 2014

(51) Int. Cl.
*H04L 27/00*    (2006.01)

(52) U.S. Cl.
USPC ............................................. 375/295; 714/790

(58) Field of Classification Search
USPC .................. 375/259–260, 295, 377; 714/790
See application file for complete search history.

(56) References Cited

U.S. PATENT DOCUMENTS

| | | | | |
|---|---|---|---|---|
| 6,553,540 | B1* | 4/2003 | Schramm et al. ............... | 714/790 |
| 7,145,917 | B1* | 12/2006 | Qian ............................... | 370/465 |
| 7,346,835 | B1* | 3/2008 | Lobinger et al. ............... | 714/790 |
| 7,650,560 | B2* | 1/2010 | Mo et al. ......................... | 714/790 |
| 8,375,261 | B2* | 2/2013 | Shi et al. ......................... | 714/708 |
| 8,423,876 | B2* | 4/2013 | Okamura et al. ............... | 714/786 |
| 2004/0257992 | A1* | 12/2004 | Dottling et al. ................ | 370/230 |
| 2006/0251001 | A1* | 11/2006 | Yun et al. ........................ | 370/315 |
| 2007/0101243 | A1* | 5/2007 | Kim et al. ....................... | 714/790 |
| 2007/0234186 | A1 | 10/2007 | Mo et al. | |
| 2010/0115372 | A1* | 5/2010 | Trachewsky et al. .......... | 714/752 |
| 2010/0199153 | A1* | 8/2010 | Okamura et al. ............... | 714/781 |
| 2011/0041023 | A1* | 2/2011 | Shimezawa et al. ........... | 714/748 |
| 2011/0185267 | A1* | 7/2011 | Lee et al. ........................ | 714/790 |
| 2012/0020302 | A1* | 1/2012 | Xiao ............................... | 370/328 |
| 2013/0297994 | A1* | 11/2013 | Eroz et al. ...................... | 714/790 |
| 2013/0336335 | A1* | 12/2013 | Hassan et al. .................. | 370/465 |

FOREIGN PATENT DOCUMENTS

EP    2157701    12/2012

OTHER PUBLICATIONS

Search Report for GB Application No. 1313398.8, dated Jan. 20, 2014.

* cited by examiner

*Primary Examiner* — Jean B Corrielus
(74) *Attorney, Agent, or Firm* — RatnerPrestia

(57) ABSTRACT

The invention provides a method of puncturing an encoded data bit stream, and an equivalent apparatus. The method applies one or more puncturing patterns to puncture the encoded data bit stream to reduce the number of transmitted bits. In one aspect there is provided a method of puncturing an encoded data bit-stream in a wireless transmitter, the encoded data bit-stream including one or more information bits, the method including receiving the encoded data bit-stream, puncturing a first group of encoded data bits and a second remaining group of encoded data bits in the encoded data bit stream using a first puncturing code rate and a second puncturing code rate respectively, wherein the first puncturing code rate is predefined, and the second puncturing code rate is determined based on the number of data bits in the second remaining group of encoded data bits.

24 Claims, 5 Drawing Sheets

DATA ENCODING METHOD AND APPARATUS

FIELD OF THE INVENTION

The present invention generally relates to wireless communications systems. In particular, the present invention relates to a method of encoding data in wireless communications systems.

BACKGROUND OF THE INVENTION

Wireless communication between electronic devices is becoming increasingly in demand, particularly due to the growth of multimedia communication services, such as video streaming, video conferencing, packet data transfer and so on. Accordingly, wireless networks are widely deployed to support these services. Generally, these networks are capable of supporting communications for multiple users by sharing the available network resources. One example of such network is a wireless local area network (WLAN).

The Institute of Electrical and Electronics Engineers (IEEE) 802.11 standard denotes a set of WLAN air interface standards developed by the IEEE 802.11 working group for short-range communications (e.g., tens of meters to a few hundred meters).

standard utilises OFDM (Orthogonal Frequency Division Multiplexing) that has been successfully used in previous forms of 802.11 standards.

OFDM is a well-known technique for transmitting high bit rate digital data signals. Rather than modulate a single carrier with a single high rate data stream, the data is divided into a number of lower rate data streams each of which is transmitted on a separate subcarriers. In this way the effect of multipath fading is mitigated. In an OFDM signal the separate subcarriers are spaced so that spectrum of subcarriers overlaps. The subcarrier frequencies are chosen so that the subcarriers are mutually orthogonal, so that the separate signals modulated onto the subcarriers can be recovered at the receiver. One OFDM symbol is defined by a set of symbols, one modulated onto each subcarrier (and therefore corresponds to a plurality of data bits). The subcarriers are orthogonal if they are spaced apart in frequency by an interval of 1/T, where T is the OFDM symbol period.

Various modulation schemes and coding rates are defined by the IEEE 802.11 standards and are represented by a Modulation and Coding Scheme (MCS) index value, Table 1 below shows the relationships between variables that allow for maximum data rate.

TABLE 1

An example of Modulation and Coding Schemes supported by the IEEE802.11ac standard for transmission of signals across a 20 MHz channel, where $N_{ss}$ (Number of spatial streams) = 3
Table 22-32-VHT MCSs for optional 20 MHz, $N_{SS}$ = 3

| MCS | | | | | | | | Data rate (Mb/s) | |
| --- | --- | --- | --- | --- | --- | --- | --- | --- | --- |
| Index | Modulation | R | $N_{BPSCS}$ | $N_{SD}$ | $N_{SP}$ | $N_{CBPS}$ | $N_{DBPS}$ | $N_{ES}$ | 800 ns GI | 400 ns GI |
| 0 | BPSK | ½ | 1 | 52 | 4 | 156 | 78 | 1 | 19.5 | 21.7 |
| 1 | QPSK | ½ | 2 | 52 | 4 | 312 | 156 | 1 | 39.0 | 43.3 |
| 2 | QPSK | ¾ | 2 | 52 | 4 | 313 | 234 | 1 | 58.5 | 65.0 |
| 3 | 16-QAM | ½ | 4 | 52 | 4 | 624 | 312 | 1 | 78.0 | 86.7 |
| 4 | 16-QAM | ¾ | 4 | 52 | 4 | 624 | 468 | 1 | 117.0 | 130.0 |
| 5 | 64-QAM | ⅔ | 6 | 52 | 4 | 936 | 624 | 1 | 156.0 | 173.3 |
| 6 | 64-QAM | ¾ | 6 | 52 | 4 | 936 | 702 | 1 | 175.5 | 195.0 |
| 7 | 64-QAM | ⅚ | 6 | 52 | 4 | 936 | 780 | 1 | 195.0 | 216.7 |
| 8 | 256-QAM | ¾ | 8 | 52 | 4 | 1248 | 936 | 1 | 234.0 | 260.0 |
| 9 | 256-QAM | ⅚ | 8 | 52 | 4 | 1248 | 1040 | 1 | 260.0 | 288.9 |

The introduction of IEEE 802.11ac amendment mandates high-throughput WLAN operation in the 5 GHz band, where there is relatively less interference and more channels are available compared to the 2.4 GHz band. According to the 802.11ac standard, the specification will enable multi-station WLAN throughput at high data rates, while using a wide bandwidth (up to 160 MHz), advanced MIMO (Multiple-Input Multiple-Output) technologies, and high-density modulation (up to 256 QAM (Quadrature Amplitude Modulation)).

The IEEE 802.11ac standard utilises a number of technologies that have been utilised within previous IEEE 802.11 standards and builds on these technologies, while adding a number of new techniques to ensure that the required throughput can be attained. For example, the IEEE 802.11ac Table 1. An example of Modulation and Coding Schemes supported by the IEEE802.11ac standard for transmission of signals across a 20 MHz channel, where $N_{ss}$ (Number of spatial streams)=3

However, a number modulation and coding schemes are not supported by the IEEE 802.11ac standard for a certain combination of variables. For example, as shown in Table 2, the IEEE 802.11ac standard does not support transmission of signals in a 20 MHz channel using MCS 9, 256 QAM with coding rate ⅚, scheme, and where $N_{ss}$, the number of spatial streams=7. This is because when block wise puncturing is applied after encoding, the total number of bits in an OFDM symbol must be a multiple of n, where n is the number of bits in a block of punctured encoded bits. This problem will now be illustrated by way of an example, with reference to FIG. 1.

TABLE 2

An example of Modulation and Coding Schemes supported by the
IEEE802.11ac standard for transmissions of signals across a
20 MHz channel, where $N_{ss} = 7$
Table 22-36-VHT MCSs for optional 20 MHz, $N_{SS} = 7$

| MCS Index | Modulation | R | $N_{BPSCS}$ | $N_{SD}$ | $N_{SP}$ | $N_{CBPS}$ | $N_{DBPS}$ | $N_{ES}$ | Data rate (Mb/s) 800 ns GI | 400 ns GI |
|---|---|---|---|---|---|---|---|---|---|---|
| 0 | BPSK | ½ | 1 | 52 | 4 | 364 | 182 | 1 | 45.5 | 50.6 |
| 1 | QPSK | ½ | 2 | 52 | 4 | 728 | 364 | 1 | 91.0 | 101.1 |
|   | QPSK | ¾ | 2 | 52 | 4 | 728 | 546 | 1 | 136.5 | 151.7 |
| 3 | 16-QAM | ½ | 4 | 52 | 4 | 1456 | 728 | 1 | 182.0 | 202.2 |
| 4 | 16-QAM | ¾ | 4 | 52 | 4 | 1456 | 1092 | 1 | 273.0 | 303.3 |
| 5 | 64-QAM | ⅔ | 6 | 52 | 4 | 2184 | 1456 | 1 | 364.0 | 404.4 |
| 6 | 64-QAM | ¾ | 6 | 52 | 4 | 2184 | 1638 | 1 | 409.5 | 455.0 |
| 7 | 64-QAM | ⅚ | 6 | 52 | 4 | 2184 | 1820 | 1 | 455.0 | 505.6 |
| 8 | 256-QAM | ¾ | 8 | 52 | 4 | 2912 | 2184 | 2 | 546.0 | 607.7 |
| 9 |  |  |  |  | Not valid |  |  |  |  |  |

In FIG. 1, each illustrated rectangle in each row represents data bits in an encoding process. The first row represents a sequence of information bits before encoding. For the sake of simplicity, in this example, the number of information bits, $N_{info}=16$.

In an OFDM communications system, the number of bits in an OFDM symbol is predefined, and is herein denoted as $N_{cbps}$. The person skilled in the art would appreciate that $N_{cbps}$ depends on a number factors including modulation order, the number of spatial streams, and the number subcarriers in an OFDM symbol. In this example, the number of bits in an OFDM symbol, $N_{cbps}$, is defined as 20. Therefore, in this example, one OFDM symbol is sufficient to transmit 16 information bits. The number of OFDM symbols is herein denoted as $N_{sym}$.

The second row in FIG. 1 represents the encoded data after encoding (e.g. convolutional encoding) is applied to the information bits. In this example, the information bits are encoded at a code rate (CR) of ½, i.e. one redundant bit is inserted after every single bit. As shown in FIG. 1, the total number of encoded bits, $N_{ebits}=32$.

In order to achieve a higher code rate, the encoded data is punctured according to a predefined puncturing pattern. In this illustrated example, block-wise puncturing is applied using a coding rate of ⅚, i.e. 4 out of every consecutive 10 encoded bits are punctured. In this case, the puncturing block size is 10.

The term "punctured block size", denoted as $L_{pblk}$, is used herein to connote the number of bits in a block of punctured encoded bits. The term "puncturing block size", herein denoted as $L_{pingblk}$, is used herein to refer to the number of bits in a block of encoded bits before puncturing is applied to the encoded bits. In the present specification, the punctured coding rate is denoted as Cr. In the illustrated example of FIG. 1, $L_{pblk}=6$, $L_{pingblk}=10$, and Cr=⅚.

It is noted that the total number of bits in the punctured encoded data must be a multiple of the punctured block size as well as multiple of $N_{cbps}$.

Essentially, the condition can be concisely expressed as the following equation:

$$\mathrm{mod}(N_{sym} \times N_{cbps}, L_{pblk}) = \quad (1)$$

where $N_{sym}=\mathrm{ceil}(N_{ebits}/\mathrm{Cr}/N_{cbps})$.

It is noted that this condition can also be satisfied by padding tail bits to the information bit sequence so that the number of encoded punctured bits is in a multiple of $L_{pblk}$. For example, in the prior art, the problem is addressed by padding extra tail bits to the information bits such that the total number of bits in the punctured encoded data is in a multiple of the punctured block size, $L_{pblk}$. As shown in FIG. 2, the information bits are padded with 34 tail bits, so that the total number of bits (i.e. the information bits plus the tail bits) before encoding is applied is 50. Therefore, the total number of OFDM symbols required in this case is three. As shown in FIG. 2, the total number of encoded bits is 100. Similarly, block-wise puncturing is applied using a coding rate of ⅚ to reduce the total number of encoded bits. In this case, the three OFDM symbols contain a total of 60 bits, which is a multiple of the punctured block size of 6. However, padding of extra tail bits to the information bits reduces the spectral efficiency, which is undesirable.

Due to this problem, a number of MCSs in the IEEE802.11ac standard are disabled. For example, transmissions of signals in a 80 MHz channel using MCS 6, where $N_{ss}=3$ and $N_{ss}=7$, are disabled. This is because multiple codewords (i.e. the number of BCC encoders, $N_{es}>1$) are used for these configurations to reduce per BCC encoder/decoder throughput, and accordingly equation (1) above can be re-expressed as:

$$\mathrm{mod}(N_{sym} \times N_{cbps}/N_{es}, L_{pblk}) = 0 \quad (2)$$

where $N_{sym}=\mathrm{floor}(N_{ebits}/\mathrm{Cr}/N_{cbps})$; and $N_{es}$ is the number of BCC encoders.

Thus, the essential problem underlying the disabled MCSs is to achieve the nominal coding rate when the number of encoded punctured bits (per OFDM symbol per codeword) is not a multiple of the puncturing block size. In the IEEE 802.11ac standard, it appears that coding rates of ⅚ and ¾ are disabled for certain configurations. It would be appreciated by the person skilled in the art that disabling these MCSs would result in the link adaptation being inconsistent. Furthermore, disabling of MCS 9 would cause a reduction of peak to data rate in some configurations, which is undesirable.

SUMMARY OF THE INVENTION

The present invention provides a method of puncturing an encoded data bit stream, and an equivalent apparatus. More specifically, the method applies one or more puncturing patterns to puncture the encoded data bit stream to reduce the number of transmitted bits, thereby increasing the coding rate.

In a first aspect of the invention, there is provided a method of puncturing an encoded data bit-stream in a wireless transmitter, the encoded data bit-stream including one or more information bits, the method comprising receiving the encoded data bit-stream, determining the number of data symbols required to transmit said one or more information bits based on a number of factors including the number of bits in the encoded data bit stream and a first puncturing code rate, determining whether a total number of punctured encoded bits to be transmitted in said determined number of data symbols is a multiple of a predefined punctured block size, wherein said predefined punctured block size is the number bits in a block of punctured encoded bits, determining a second puncturing code rate for one or more remaining data bits of said total number of punctured encoded bits to be transmitted in said determined number of data symbols if said determined total number of punctured encoded bits to be transmitted in said determined number of data symbols is not a multiple of said predefined punctured block size, and puncturing a first group of encoded data bits and a second remaining group of encoded data bits in said encoded data bit stream using said first puncturing code and said second puncturing code respectively.

The second puncturing code rate may be determined based on the number of bits in said second remaining group of encoded data bits and said one or more remaining data bits of said total number of punctured encoded bits to be transmitted in said determined number of data symbols.

In a second aspect of the invention there is provided a method of puncturing an encoded data bit-stream in a wireless transmitter, the encoded data bit-stream including one or more information bits, the method comprising receiving the encoded data bit-stream, puncturing a first group of encoded data bits and a second remaining group of encoded data bits in said encoded data bit stream using a first puncturing code rate and a second puncturing code respectively, wherein the first puncturing code rate is predefined, and the second puncturing code rate is determined based on the number of data bits in said second remaining group of encoded data bits.

The method may further comprise determining the number of remaining bits of a total number of punctured encoded bits to be transmitted in one or more data symbols, the total number of punctured encoded bits to be transmitted being determined based on said first puncturing code rate being applied to said information bits.

The step of determining said second puncturing code may be expressible in the form $CR_2 = L_n / L_m$, where $L_n$ is the number the number of bits in said second remaining group of encoded data bits, and $L_m$ is the said one or more remaining data bits of said total number of punctured encoded bits to be transmitted in said determined number of data symbols.

The step of puncturing may include applying a first puncturing pattern on said first group of encoded data bits, the first puncturing pattern being derived based on said first puncturing rate, and applying a second puncturing pattern on said second group of encoded data bits, the second puncturing pattern being derived based on said first puncturing pattern.

The second puncturing pattern may be a truncated version of said first puncturing pattern.

The data symbols may include OFDM symbols.

The information bits may be encoded in accordance with IEEE 802.11 WLAN standard.

In a third aspect of the invention there is provided a wireless communication device comprising an encoder for encoding information bits from a data source to produce an encoded data bit-stream, a data puncturer for puncturing the encoded data bit-stream, the data puncturer being operable to:
receive the encoded data bit-stream;
determine the number of data symbols required to transmit said information bits based on a number of factors including the number of bits in the encoded data bit-stream and a first puncturing code rate;
determine whether a total number of punctured encoded bits to be transmitted in said determined number of data symbols is a multiple of a predefined punctured block size, wherein said predefined punctured block size is the number of bits in a block of punctured encoded bits;
determine a second puncturing code rate for one or more remaining data bits of said total number of punctured encoded bits to be transmitted in said determined number of data symbols if said determined total number of punctured encoded bits to be transmitted in said determined number of data symbols is not a multiple of said predefined punctured block size; and
puncture a first group of encoded data bits and a second remaining group of encoded data bits in said encoded data bit-stream using said first puncturing code rate and said second puncturing code rate respectively.

The data puncturer may be further operable to determine said second puncturing code rate based on the number of bits in said second remaining group of encoded data bits and said one or more remaining data bits of said total number of punctured encoded bits to be transmitted in said determined number of data symbols.

In a fourth aspect of the invention there is provided a wireless communication device comprising an encoder for encoding information bits from a data source to produce an encoded data bit-stream, a data puncturer for puncturing the encoded data bit-stream, the data puncturer being operable to puncture a first group of encoded data bits and a second remaining group of encoded data bits in said encoded data bit stream using a first puncturing code rate and a second puncturing code rate respectively, wherein the first puncturing code rate is predefined, and the second puncturing code rate is determined based on the number of data bits in said second remaining group of encoded data bits.

The data puncturer may be operable to determine the number of remaining bits of a total number of punctured encoded bits to be transmitted in a number of data symbols, the total number of punctured encoded bits to be transmitted being determined based on said puncturing code being applied to said information bits.

The second puncturing code may be expressible in the form $CR_2 = L_n / L_m$, where $L_n$ is the number the number of bits in said second remaining group of encoded data bits, and $L_m$ is the said one or more remaining data bits of said total number of punctured encoded bits to be transmitted in said determined number of data symbols.

The data puncturer may be further operable to apply a first puncturing pattern on said first group of encoded data bits, the first puncturing being derived based on said first puncturing rate, and applying a second puncturing pattern on said second group of encoded data bits, the second puncturing pattern being derived based on said first puncturing pattern.

The second puncturing pattern may be a truncated version of said first puncturing pattern.

The data symbols may include OFDM symbols.

The information bits may be encoded in accordance with IEEE 802.11 WLAN standard.

One embodiment provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

DESCRIPTION OF THE DRAWINGS

Embodiments will be described with reference to the accompanying drawings, in which.

DETAILED DESCRIPTION

Specific embodiments will be described in further detail in the following paragraphs on the basis of the attached figures. It will be appreciated that this is by way of example only, and should not be viewed as presenting any limitation on the scope of protection sought.

Figure 3:
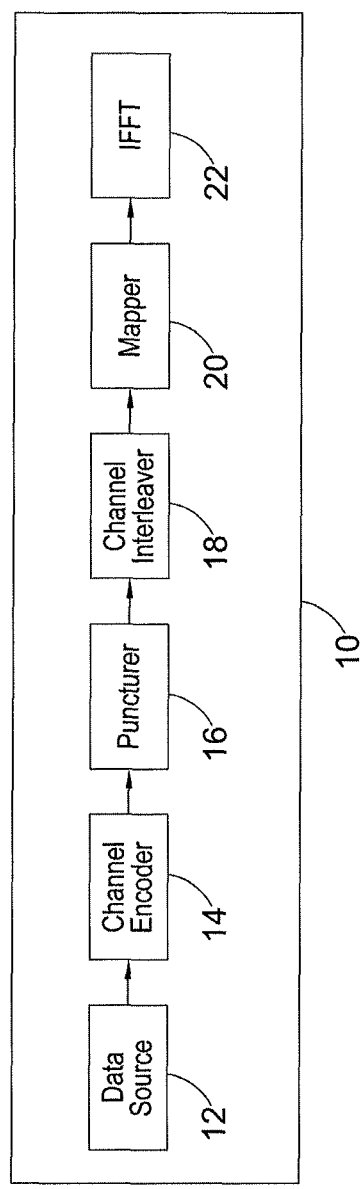
FIG. 3 is a simplified schematic illustration of a transmitter according to an embodiment of the invention.

FIG. 3 shows a simplified block diagram representation of transmitter 10 according to an embodiment of the invention. It will be appreciated that, in many circumstances, a wireless communications device will be provided with the facilities of a transmitter and a receiver in combination but, for this example, the device have been illustrated as a one way communication device for reasons of simplicity. The term "communication device" is used herein to refer to an access point (AP) or a user terminal (UE) in a WLAN communication network. In the illustrated embodiment, the communications system operates as an OFDM (Orthogonal Frequency Division Multiplexing) communication system, although the principles of the present invention may be employed in other communication systems.

Figure 1:
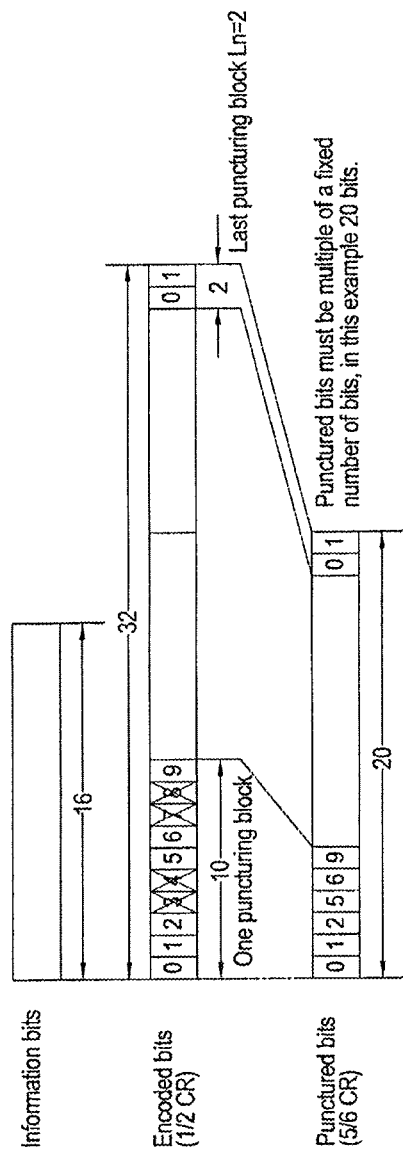
FIG. 1 illustrates the process of encoding information bits according to the prior art.
Figure 2:
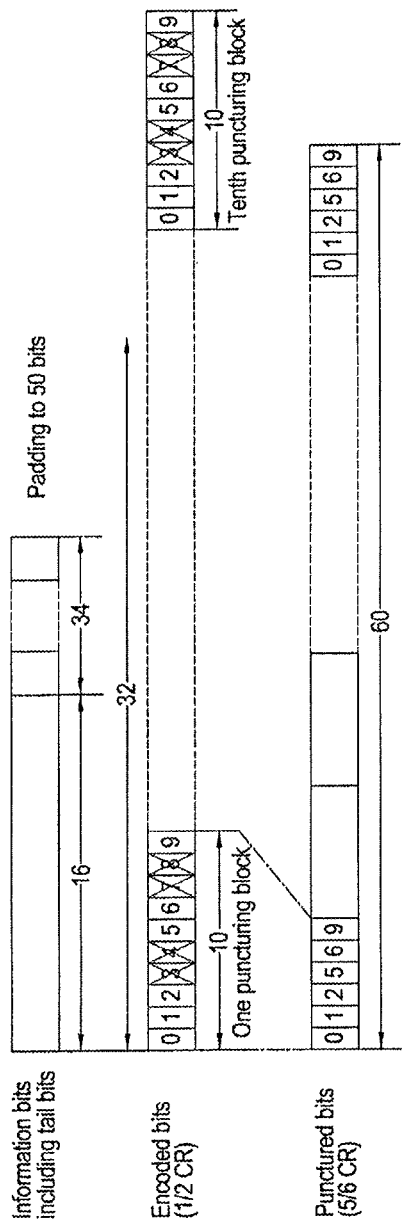
FIG. 2 illustrates the process of encoding information bits with padded tail bits according to the prior art.

Referring to the transmitter 10 in FIG. 1, a data source 12 provides data (comprising information bits or data symbols) to a channel encoder 14. The channel encoder 14 typically comprises a convolutional coder such as, for example a recursive systematic convolutional (RSC) encoder, or a stronger so-called turbo encoder (which includes an interleaver). More bits are output than are input, and typically the code rate is ½ or ⅓. Thus, the code rate may be expressed as a ratio of the number of bits, k, input into the encoder to the number of bits, m, output by the encoder in a given encoder cycle. It will be well known to the skilled person in the industries of transmitter that any standard channel coding technology could be used, for example Reed Solomon, concatenated Reed Solomon and Viterbi, turbo product or convolutional code, or low-density parity check (LDPC) codes.

The channel encoder 14 is followed by a puncturer 16. In this example, the channel encoder 14 and the puncturer 16 are illustrated as separate blocks. However, it would be appreciated by the skilled person that a single encoder/puncturer may be implemented. The puncturer 16 punctures the encoded data using predefined puncturing pattern to reduce the number of transmitted bits and to increase the coding rate. Effectively, the puncturer 16 removes some of the encoded bits at the output of the encoder 14. In an embodiment of the invention, the puncturer 16 is configured to puncture the encoded data using more than one puncturing patterns if it determines that the resultant punctured encoded data is not a multiple of the punctured block size when only one puncturing pattern is applied. The specific method of the puncturing process will be described in due course.

The puncturer 16 is followed by a (optional) channel interleaver 18 for bit interleaving as specified in a standard, for example the IEEE 802.11ac standard. It would be appreciated that any suitable method of interleaving the punctured encoded data may be employed, and therefore details of performing the interleaving will not be described. The output of the interleaver 18 is provided to a mapper 20 that is operable to map the coded and interleaved data sequence onto a complex constellation, for example, QPSK (Quadrature Phase Shift Keying) symbols, 16 QAM (Quadrature Amplitude Modulation) symbols according to the Gray code constellation mapping.

Once mapped, the symbols are provided to an IFFT (Inverse Fast Fourier Transform) module 22 for converting the domain of the data symbols into the time domain. The transformed symbols are processed and modulated for transmission on a radio channel. It will be understood that the transmitter 10 may include other components such as a DAC (Digital to Analogue Converter) and a RF (radio frequency) module. However, it will be appreciated that the transmitter 10 is a simplified illustration, omitting some elements for the purpose of clarity.

Figure 4:
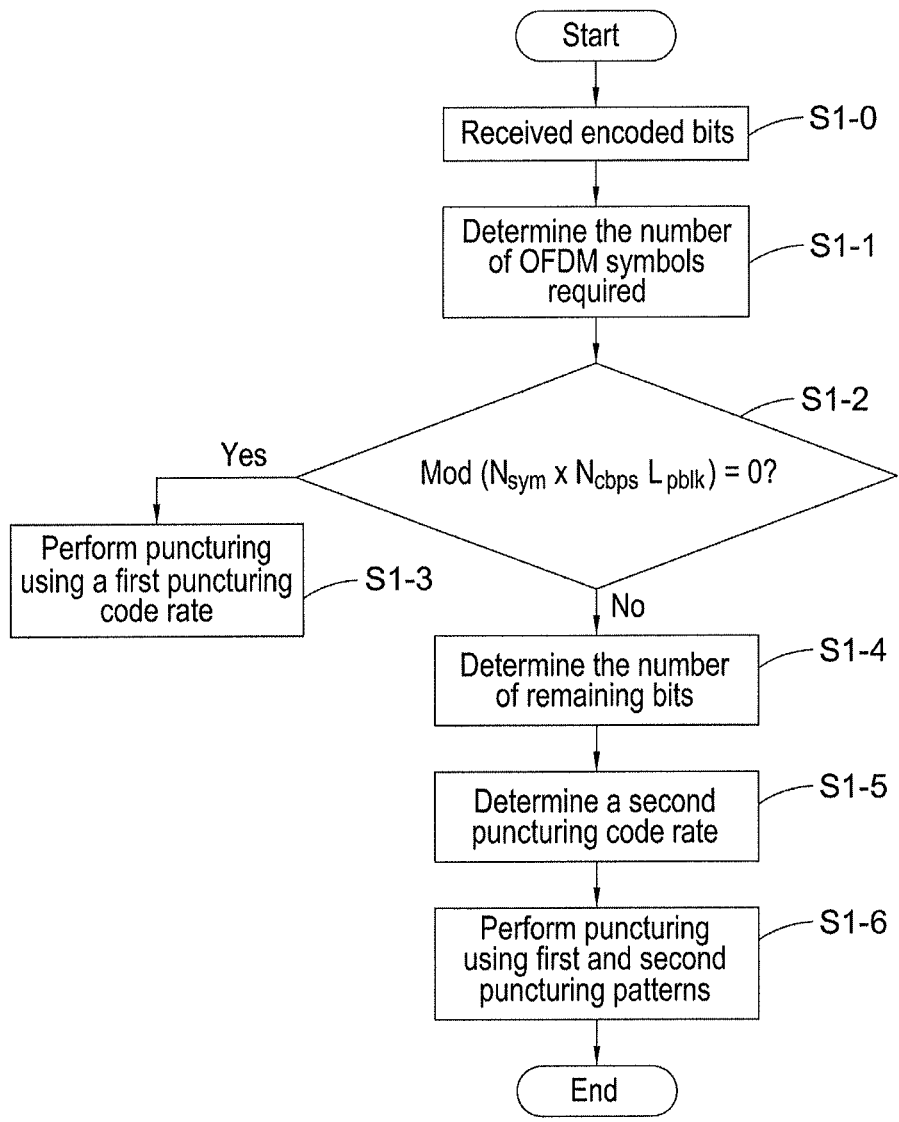
FIG. 4 is flow diagram of a puncturing method according to an embodiment of the invention.

FIG. 4 illustrates the process of puncturing encoded data symbols according to an embodiment of the invention. The puncturer 16 performs the puncturing process according to the following procedure:

Step S1-0: Receive encoded bits, $N_{ebits}$, from the encoder 14.

Step S1-1: Assuming that the number of bits in an OFDM symbol is predefined, determine the number of OFDM symbols required to transmit the information bits as follows:

$$N_{sym} = \text{ceil}(N_{ebits}/Cr/N_{cbps})$$

S1-2: Determine whether the total number of punctured encoded bits to be transmitted in the determined number OFDM symbols is a multiple of a predefined punctured block size:

$$\text{mod}(N_{sym} \times N_{cbps}, L_{pblk}) = 0$$

If the total number of bits is in the multiple of the predefined punctured block size, i.e. mod $(N_{sym} \times N_{cbps}, L_{pblk}) = 0$, the puncturing process will be performed using only the first puncturing code rate, Cr (step S1-3).

If the total number of bits is not in the multiple of the predefined punctured block size, i.e. mod $(N_{sym} \times N_{cbps}, L_{pblk}) \neq 0$, the number of remaining bits will be determined in step S1-4.

Step S1-5: Determine a second puncturing pattern for the remaining bits. The second puncturing rate for the remaining bits can be determined based on the number of remaining bits in the encoded data block and the number of remaining bits in the encoded punctured data block, expressed respectively as:

$$\mod(N_{sym} \times N_{cbps}/N_{es}, L_{pblk}) = L_n,$$

and $$\mod(\text{ceil}(N_{sym} \times N_{cbps} \times 2 \times Cr/N_{es}), L_{pingblk}) = L_m$$

The second puncturing rate, $Cr_2$, is expressed as $L_n/L_m$.

It is noted that any puncturing pattern resulting in this puncturing rate would be sufficient. One example a second puncturing pattern would be a truncated pattern from the first puncturing pattern if it results in the puncturing rate $L_n/L_m$.

Step S1-6: Perform the puncturing process using the first and second puncturing patterns to puncture encoded bits in a portion of the encoded data and the remaining encoded bits respectively. Effectively, two different puncturing code rates are applied to the encoded data.

For example, a portion of the encoded data is punctured using a puncturing code rate of 5/6 and a first puncturing pattern is applied on each block of encoded bits that portion of encoded data. In this example, the puncturing block size is 10, i.e. 6 encoded bits are produced out of every 10 encoded bits in a block. The remaining encoded bits are punctured using a puncturing code of 3/4 and a second puncturing pattern. If there are 6 remaining encoded bits, 4 encoded bits will be produced out of the 6 remaining encoded bits. As a result, the encoded bits of the OFDM symbols are effectively punctured using two code rates and puncturing patterns. It is noted that the second puncturing pattern can either be a truncated version of the first puncturing pattern or a new puncturing pattern independent on the first puncturing pattern.

Referring back to the previous example of data transmissions in a 20 MHz channel using MCS 9, with the parameters $N_{cbps}=416$ ($N_{ss}=1$, $N_{sd}=52$), $CR_p=5/6$, $N_{sym}=1$. In this case, the punctured block size of 6 using the first puncturing pattern results in 2 remaining bits:

$$\mod(416 \times 1, 6) = 2 \text{ and } \mod(\text{ceil}(416 \times 2 \times 5/6), 10) = 2$$

Thus, the following puncturing patterns are applied to a first set of encoded bits and the remaining encoded bits respectively:

First puncturing pattern=[1110011001]; and

Second puncturing pattern=[11].

Therefore, in this example, none of the remaining encoded bits is removed.

Figure 5:
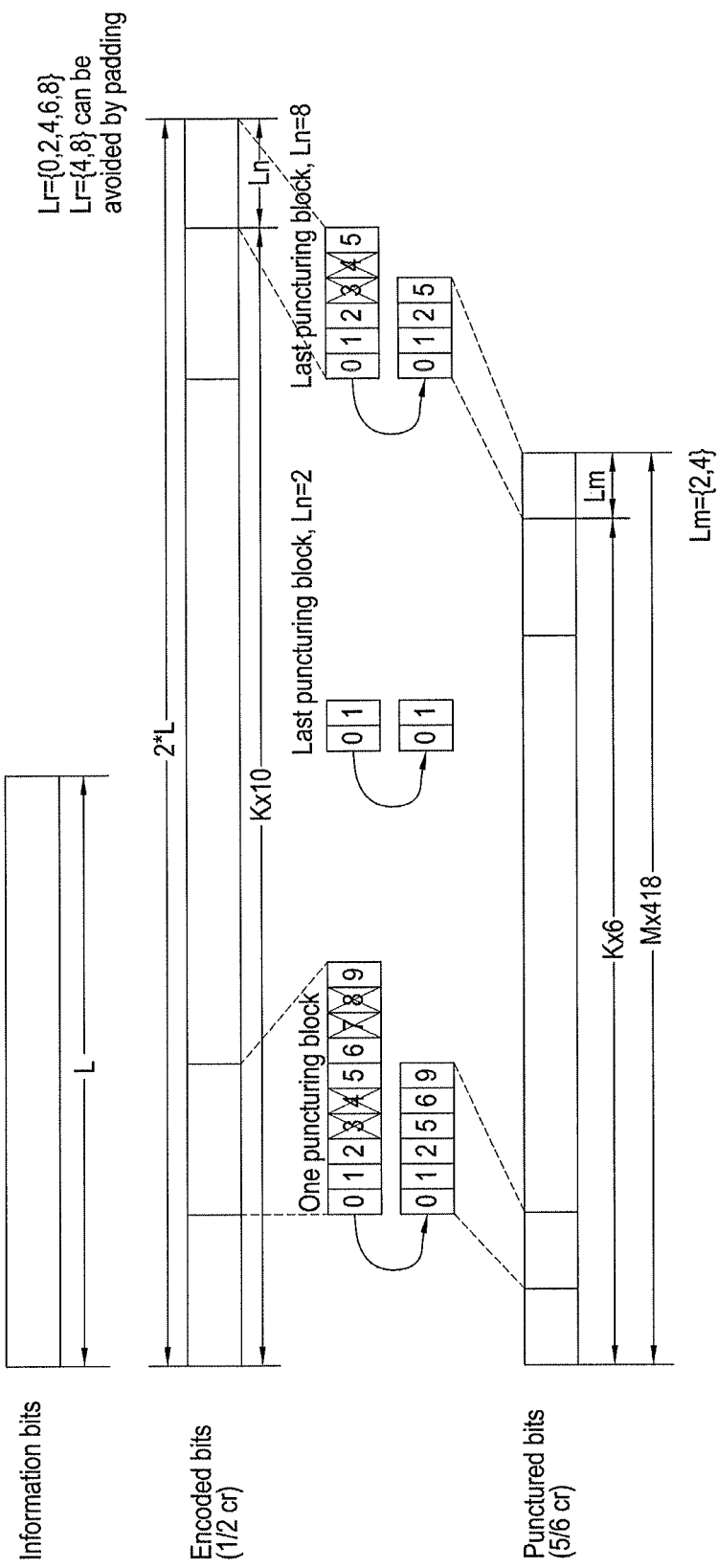
FIG. 5 illustrates the process of encoding information bits according to an embodiment of the invention.

The present invention will now be further illustrated by way of an example, with reference to FIG. 5.

In FIG. 5, each illustrated rectangle in each row represents data in an encoding process. The first row represents the number of information bits before encoding. In this example, the number of information bits, $N_{info}=L$. The second row represents the encoded data once encoding is applied to the information bits. In this example, the information bits are encoded at a code rate (CR) of ½, and therefore the total number of encoded bits, $N_{ebits}=2L$.

As illustrated in FIG. 5, the encoded bits are divided into K number of puncturing blocks, each having a puncturing block size of 10. In FIG. 5, the remaining bits are denoted by $L_n$, i.e. the number of bits in the last puncturing block, and the number of remaining bits in the last punctured block is denoted by $L_m$. It is noted that the puncturing pattern applied to the last puncturing block, i.e. the second puncturing pattern, depends on the number of remaining bits.

For example, as illustrated in FIG. 5, a puncturing pattern of [11] is applied for $L_n=2$; and a puncturing pattern of [111001] is applied for $L_n=6$.

It is further noted in FIG. 5 that instead of applying a second puncturing pattern, tail bits can be padded to the information bits if $L_n=4$ or $L_n=8$. As described in the background section of this document, padding of extra tail bits to the information bits increases the number of redundant bits, which is undesirable.

As shown in FIG. 5, the total number of punctured encoded bits to be transmitted is denoted as $(K \times 6) + L_m$, where $L_m$ is the number of bits in the last punctured block after the second puncturing pattern is applied to the last puncturing block.

It is appreciated that the implementation of two puncturing patterns will result in a coding rate that is different from, or indeed slightly lower than, the nominal coding rate as specified in a standard. However, in most standards, such as the IEEE802.11ac standard, the number of punctured bits is large enough such that the effective reduction in coding rate is almost negligible.

Table 3 below summarises the MCSs that were previously disabled under the IEEE802.11ac standard. The last column of Table 3 provides the suggested puncturing pattern for the remaining bits.

TABLE 3

| Modulation | Code Rate | $N_{sd}$ | $N_{cbps}$ | $N_{ss}$ | $N_{es}$ | $N_{cbps\_pcw}$ | Suggested puncturing pattern for the remaining puncturing block |
|---|---|---|---|---|---|---|---|
| 256QAM | 5/6 | 52 | 416 | 1 | 1 | 416 | [1 1] |
| 256QAM | 5/6 | 52 | 832 | 2 | 1 | 832 | [1 1 1 0 0 1] |
| 256QAM | 5/6 | 52 | 1664 | 4 | 1 | 1664 | [1 1] |
| 256QAM | 5/6 | 52 | 2080 | 5 | 1 | 2080 | [1 1 1 0 0 1] |
| 256QAM | 5/6 | 52 | 2912 | 7 | 2 | 1456 | [1 1 1 0 0 1] |
| 256QAM | 5/6 | 52 | 3328 | 8 | 2 | 1664 | [1 1] |
| 256QAM | 5/6 | 234 | 11232 | 6 | $6^{Note\ 2}$ | 1872 | N.A$^{Note\ 1}$ |
| 256QAM | 5/6 | 468 | 11232 | 3 | $6^{Note\ 2}$ | 1872 | N.A$^{Note\ 1}$ |
| 64QAM | 3/4 | 234 | 4212 | 3 | 2 | 2106 | [1 1] |
| 64QAM | 3/4 | 234 | 9828 | 7 | $6^{Note\ 2}$ | 1638 | [1 1] |

$^{Note\ 1}$For this case, the number of coded bits is multiple of 6 and the nominal puncturing pattern applies.
$^{Note\ 2}$$N_{es}$ = 5 results a non-integer number of coded bits per encoder; therefore $N_{es}$ = 6 is chosen instead of 5.

It is noted that the skilled person in the art would appreciate that when two puncturing patterns are used to puncture an encoded data at a transmitter, two de-puncturing patterns are also required at a receiver in order to recover the transmitted data. Broadly speaking the receiver is a mirror image of the transmitter. The transmitter and receiver may be combined to form an OFDM transceiver.

While the foregoing specific description of an embodiment of the invention has been provided for the benefit of the skilled reader, it will be understood that it should not be read as mandating any restriction on the scope of the invention. The invention should be considered as characterised by the claims appended hereto, as interpreted with reference to, but not bound by, the supporting description.

The invention claimed is:

1. A method of puncturing an encoded data bit-stream in a wireless transmitter, the encoded data bit-stream including one or more information bits, the method comprising:
receiving the encoded data bit-stream,
determining the number of data symbols required to transmit said one or more information bits based on a number of factors including the number of bits in the encoded data bit stream and a first puncturing code rate;
determining whether a total number of punctured encoded bits to be transmitted in said determined number of data symbols is a multiple of a predefined punctured block size, wherein said predefined punctured block size is the number bits in a block of punctured encoded bits;
determining a second puncturing code rate for one or more remaining data bits of said total number of punctured encoded bits to be transmitted in said determined number of data symbols if said determined total number of punctured encoded bits to be transmitted in said determined number of data symbols is not a multiple of said predefined punctured block size; and
puncturing a first group of encoded data bits and a second remaining group of encoded data bits in said encoded data bit stream using said first puncturing code and said second puncturing code respectively.

2. A method according to claim 1, wherein said second puncturing code rate is determined based on the number of bits in said second remaining group of encoded data bits and said one or more remaining data bits of said total number of punctured encoded bits to be transmitted in said determined number of data symbols.

3. A method according to claim 2, wherein the step of determining said second puncturing code rate is expressible in the form $CR_2 = L_n/L_m$, where $L_n$ is the number of bits in said second remaining group of encoded data bits, and $L_m$ is the one or more remaining data bits of said total number of punctured encoded bits to be transmitted in said determined number of data symbols.

4. A method according to claim 1, wherein the step of puncturing includes applying a first puncturing pattern on said first group of encoded data bits, the first puncturing being derived based on said first puncturing code rate, and applying a second puncturing pattern on said second group of encoded data bits, the second puncturing pattern being derived based on said first puncturing pattern.

5. A method according to claim 4, wherein said second puncturing pattern is a truncated version of said first puncturing pattern.

6. A method according to claim 1, wherein said data symbols include OFDM (Orthogonal Frequency Division Multiplexing) symbols, or wherein the information bits are encoded in accordance with IEEE 802.11 WLAN (Wireless Local Area Network) standard.

7. A non transitory carrier medium carrying computer readable code for controlling a computer to carry out the method of claim 1.

8. A method of puncturing an encoded data bit-stream in a wireless transmitter, the encoded data bit-stream including one or more information bits, the method comprising:
receiving the encoded data bit-stream;
puncturing a first group of encoded data bits and a second remaining group of encoded data bits in said encoded data bit stream using a first puncturing code rate and a second puncturing code rate respectively, wherein the first puncturing code rate is predefined, and the second puncturing code rate is determined based on the number of data bits in said second remaining group of encoded data bits.

9. A method according to claim 8, further comprising determining the number of remaining bits of a total number of punctured encoded bits to be transmitted in a number of data symbols, the total number of punctured encoded bits to be transmitted being determined based on said first puncturing code rate being applied to said information bits.

10. A method according to claim 9, wherein the step of determining said second puncturing code rate is expressible in the form $CR_2 = L_n/L_m$, where $L_n$ is the number of bits in said second remaining group of encoded data bits, and $L_m$ is the one or more remaining data of said total number of punctured encoded bits to be transmitted in said determined number of data symbols.

11. A method according to claim 8, wherein the step of puncturing includes applying a first puncturing pattern on said first group of encoded data bits, the first puncturing pattern being derived based on said first puncturing code rate, and applying a second puncturing pattern on said second group of encoded data bits, the second puncturing pattern being derived based on said first puncturing pattern.

12. A method according to claim 11, wherein said second puncturing pattern is a truncated version of said first puncturing pattern.

13. A wireless communication device comprising:
an encoder for encoding information bits from a data source to produce an encoded data bit-stream;
a data puncturer for puncturing the encoded data bit-stream, the data puncturer being operable to:
receive the encoded data bit-stream;
determine the number of data symbols required to transmit said information bits based on a number of factors including the number of bits in the encoded data bit-stream and a first puncturing code rate;
determine whether a total number of punctured encoded bits to be transmitted in said determined number of data symbols is a multiple of a predefined punctured block size, wherein said predefined punctured block size is the number of bits in a block of punctured encoded bits;
determine a second puncturing code rate for one or more remaining data bits of said total number of punctured encoded bits to be transmitted in said determined number of data symbols if said determined total number of punctured encoded bits to be transmitted in said determined number of data symbols is not a multiple of said predefined punctured block size; and
puncture a first group of encoded data bits and a second remaining group of encoded data bits in said data bit-stream using said first puncturing code rate and said second puncturing code rate respectively.

14. A wireless communication device according to claim 13, wherein the data puncturer is further operable to determine said second puncturing code rate based on the number of bits in said second remaining group of encoded data bits and said one or more remaining data bits of said total number of punctured encoded bits to be transmitted in said determined number of data symbols.

15. A wireless communication device according to claim 14, wherein the second puncturing code rate is expressible in the form $CR_2 = L_n/L_m$, where $L_n$ is the number of bits in said second remaining group of encoded data bits, and $L_m$ is the one or more remaining data bits of said total number of punctured encoded bits to be transmitted in said determined number of data symbols.

16. A wireless communication device according to claim 13, wherein the data puncturer is further operable to apply a first puncturing pattern on said first group of encoded data bits, the first puncturing being derived based on said first puncturing code rate, and applying a second puncturing pattern on said second group of encoded data bits, the second puncturing pattern being derived based on said first puncturing pattern.

17. A wireless communication device according to claim 16, wherein said second puncturing pattern is a truncated version of said first puncturing pattern.

18. A wireless communication device according to claim 13, wherein said data symbols include OFDM (Orthogonal Frequency Division Multiplexing) symbols, or wherein the information bits are encoded in accordance with IEEE 802.11 WLAN (Wireless Local Area Network) standard.

19. A non transitory carrier medium carrying computer readable code for configuring computer as the device of claim 13.

20. A wireless communication device comprising:
 an encoder for encoding information bits from a data source to produce an encoded data bit-stream;
 a data puncturer for puncturing the encoded data bit-stream, the data puncturer being operable to puncture a first group of encoded data bits and a second remaining group of encoded data bits in said encoded data bit stream using a first puncturing code rate and a second puncturing code rate respectively, wherein the first puncturing code rate is predefined, and the second puncturing code rate is determined based on the number of data bits in said second remaining group of encoded data bits.

21. A wireless communication device according to claim 20, wherein the data puncturer is operable to determine the number of remaining bits of a total number of punctured encoded bits to be transmitted in a number of data symbols, the total number of punctured encoded bits to be transmitted being determined based on said first puncturing code rate being applied to said information bits.

22. A wireless communication device according to claim 21, wherein the second puncturing code rate is expressible in the form $CR_2=L_n/L_m$, where $L_n$ is the number of bits in said second remaining group of encoded data bits, and $L_m$ is the one or more remaining data bits of said total number of punctured encoded bits to be transmitted in said determined number of data symbols.

23. A wireless communication device according to claim 20, wherein the data puncturer is further operable to apply a first puncturing pattern on said first group of encoded data bits, the first puncturing pattern being derived based on said first puncturing code rate, and applying a second puncturing pattern on said second group of encoded data bits, the second puncturing pattern being derived based on said first puncturing pattern.

24. A wireless communication device according to claim 23, wherein said second puncturing pattern is a truncated version of said first puncturing pattern.

* * * * *

UNITED STATES PATENT AND TRADEMARK OFFICE
CERTIFICATE OF CORRECTION

PATENT NO. : 8,934,568 B2  
APPLICATION NO. : 13/617091  
DATED : January 13, 2015  
INVENTOR(S) : Tong Page 1 of 1

It is certified that error appears in the above-identified patent and that said Letters Patent is hereby corrected as shown below:

In the Specification

In Column 2, Line 22, delete "value," and insert -- value. --, therefor.

In Column 2, Lines 52-55, delete "Table 1. An example of Modulation and Coding Schemes supported by the IEEE802.11ac standard for transmission of signals across a 20 MHz channel, where $N_{ss}$ (Number of spatial streams) = 3".

In Column 3, in Table 2, below MCS Index & Modulation, Line 3, delete "QPSK" and insert -- 2 QPSK --, therefor.

In Column 4, Line 24, delete "is applied is" and insert -- applied is --, therefor.

In Column 7, Line 19, delete "DESCRIPTION" and insert -- DETAILED DESCRIPTION --, therefor.

In the Claims

In Column 12, Line 16, in Claim 10, delete "data" and insert -- data bits --, therefor.

Signed and Sealed this  
Eleventh Day of August, 2015

Michelle K. Lee  
*Director of the United States Patent and Trademark Office*